United States Patent [19]
Yu

[11] Patent Number: 6,030,100
[45] Date of Patent: Feb. 29, 2000

[54] CONTROL APPARATUS FOR RESETTING A SHIELDING WHEEL OF A STEPWISE LIGHT PROJECTING DEVICE

[75] Inventor: Jason Yu, Taipei, Taiwan

[73] Assignee: J.A.L. Taiwan Ltd., Chung-Ho, Taiwan

[21] Appl. No.: 09/121,412

[22] Filed: Jul. 23, 1998

Related U.S. Application Data

[63] Continuation-in-part of application No. 08/795,073, Feb. 5, 1997, abandoned.

[51] Int. Cl.$^7$ ........................................... F21V 21/28
[52] U.S. Cl. ......................... 362/276; 362/284; 362/293; 362/324
[58] Field of Search .................................. 362/276, 383, 362/386, 282, 284, 322, 324, 293, 802, 35, 283, 323, 319; 353/84

[56] References Cited

U.S. PATENT DOCUMENTS

| | | | |
|---|---|---|---|
| 3,045,208 | 7/1962 | Tiberio | 362/284 |
| 3,603,722 | 9/1971 | Graham | 178/5.4 |
| 4,600,976 | 7/1986 | Callahan | 362/277 |
| 4,878,109 | 10/1989 | Hillis | 358/42 |
| 4,914,556 | 4/1990 | Richardson | 362/293 |
| 5,513,083 | 4/1996 | Chang | 362/284 |
| 5,665,305 | 9/1997 | Belliveau | 362/268 |
| 5,868,482 | 2/1999 | Edlinger | 353/84 |

*Primary Examiner*—Cassandra Spyrou
*Assistant Examiner*—Leo Boutsikaris
*Attorney, Agent, or Firm*—Sheridan Ross P.C.

[57] ABSTRACT

A control apparatus capable of resetting a shielding wheel of a stepwise light projecting device to a predetermined starting position includes a photosensor, a slotted wheel and a control circuit unit. The device includes a stepping motor, an output shaft which extends outwardly from front and rear lateral walls of the motor, and the shielding wheel fixed to a front end of the shaft. The photosensor includes a phototransmitter and a photoreceiver spaced from the phototransmitter to define a channel therebetween. The slotted wheel is mounted on a rear end of the shaft, and has a circumferential portion that extends into the channel and that is formed with a radial slot to permit transmission of radiant energy from the phototransmitter to the protoreceiver only when the shielding wheel is in the starting position. When the shielding wheel is in the starting position, the control circuit unit activates the stepping motor to rotate the shielding wheel in a stepwise manner in order to result in a predetermined stepwise light projecting effect.

3 Claims, 5 Drawing Sheets

CONTROL APPARATUS FOR RESETTING A SHIELDING WHEEL OF A STEPWISE LIGHT PROJECTING DEVICE

CROSS-REFERENCE OF RELATED APPLICATION

This invention is a Continuation-in-Part application of U.S. patent application Ser. No. 08/795,073, which was filed on Feb. 5, 1997, abandoned on Jun. 20, 1998.

BACKGROUND OF THE INVENTION

1. Field of the Invention

The invention relates to a control apparatus, more particularly to a control apparatus capable of resetting a shielding wheel of a stepwise light projecting device to a predetermined starting position when actuated before the light projecting device generates a predetermined stepwise light projecting effect.

2. Description of the Related Art

Referring to FIGS. 1, 2 and 2A, a first conventional light projecting device 10 is shown to include a casing provided with a frontward magnifying lens 18, a driving unit 14 disposed in the casing and supported by a vertical stand 12, a shielding wheel 15 mounted uprightly on a horizontally extending shaft 13 of the driving unit 14, and a light source 11 disposed in the casing and spaced from the shielding wheel 15 in such a manner that light rays emitted by the light source 11 can pass through the wheel 15 and the magnifying lens 18 to an exterior of the casing.

As illustrated, the shielding wheel 15 has a plurality of angularly spaced openings 16 formed therethrough. A plurality of differently colored sheets 17 are attached to the wheel 15 by the use of an adhesive 160 so as to cover the openings 16, respectively. Thus, differently colored rays are emitted to the exterior of the casing upon actuation of the driving unit 14.

A drawback of the aforementioned conventional light projecting device resides in that, after each use, the wheel 15 does not stop at a predetermined starting position. Thus, the wheel 15 must be moved manually so as to dispose the same at the starting position in order to achieve a predetermined light projecting effect. This annoys the user of the light projecting device.

Referring to FIG. 3, a conventional light-projecting device is shown to be similar in structure to the device of FIG. 1, except that a control circuit means is employed (not visible) and that, upon activation of the driving unit 14A, the shielding wheel 15A rotates in a clockwise direction in an initialization mode until an outward protrusion 20 on the wheel 15A collides against a stop element 22 of the driving unit 14A. At this time, the control circuit means activates the shielding wheel 15A to rotate stepwise in the anticlockwise direction in a regular mode to achieve the predetermined light projecting effect.

Note that intermittent collision of the protrusion 20 against the stop element 22 may eventually deform the shaft 13 of the driving unit 14A. In addition, the adhesively mounted colored sheets 17A may loosen or separate from the wheel 15A. Furthermore, the precision of resetting the wheel 15A is relatively poor.

SUMMARY OF THE INVENTION

The object of this invention to provide a control apparatus capable of resetting a shielding wheel of a stepwise light projecting device to a predetermined starting position when actuated before the light projecting device generates a predetermined stepwise light projecting effect.

Accordingly, the control apparatus of this invention is capable of resetting a shielding wheel of a stepwise light projecting device to a predetermined starting position, includes a photosensor, a slotted wheel and control circuit means. The stepwise light projecting device includes a stepping motor with a casing, the shielding wheel, and a light source. The stepping motor further includes a rotor mounted rotatably in the casing, and an output shaft coupled to and driven by the rotor. The output shaft has front and rear ends that respectively extend outwardly of front and rear lateral walls of the casing. The shielding wheel is mounted uprightly on and is rotatable with the front end of the output shaft, and has a peripheral portion which is sized so as to extend above the top wall of the casing of the stepping motor and which is formed with a plurality of through holes angulary spaced from one another by an interval. The shielding wheel is further provided with a plurality of differently colored transparent sheets that cover the through holes, respectively. The light source is disposed spacedly behind the shielding wheel, and can be activated so as to emit a light beam that travels along a route above the top wall of the casing of the stepping motor and that passes successively through the colored transparent sheets when the shielding wheel rotates so as to illuminate an object in front of the shielding wheel with colored light rays. The photosensor is adapted to be mounted on the rear lateral wall of the casing of the stepping motor, and includes a phototransmitter and a photoreceiver spaced from the phototransmitter to define a channel therebetween. The slotted wheel is adapted to be mounted detachably and uprightly on and is adapted to rotate with the rear end of the output shaft, and has a circumferential portion which extends into the channel of the photosensor and which is formed with a radial slot to permit transmission of radiant energy from the phototransmitter to the photoreceiver only when the shielding wheel is in the predetermined starting position. Under such a condition, one of the colored transparent sheets is aligned with the light source. The control circuit means is connected electrically to the photosensor and is adapted to be connected electrically to the stepping motor. The control circuit means is activable to operate in an initialization mode, in which the control circuit means is adapted to activate the stepping motor to rotate the shielding wheel stepwise by a first angular magnitude smaller than the interval between an adjacent pair of the through holes in the shielding wheel when the slotted wheel blocks transmission of the radiant energy from the phototransmitter to the photoreceiver until the shielding wheel is in the predetermined starting position. After the initialization mode, the control circuit means is activable to operate in a regular mode, in which the control circuit means is adapted to activate the stepping motor to rotate the shielding wheel stepwise by a second angular magnitude equal to the interval between the adjacent pair of the through holes in the shielding wheel in order to result in a predetermined stepwise light projecting effect when the light source is activated.

BRIEF DESCRIPTION OF THE DRAWINGS

Other features and advantages of this invention will become apparent in the following detailed description of the preferred embodiment of this invention, with reference to the accompanying drawings, in which.

DETAILED DESCRIPTION OF THE PREFERRED EMBODIMENT

Figure 1:
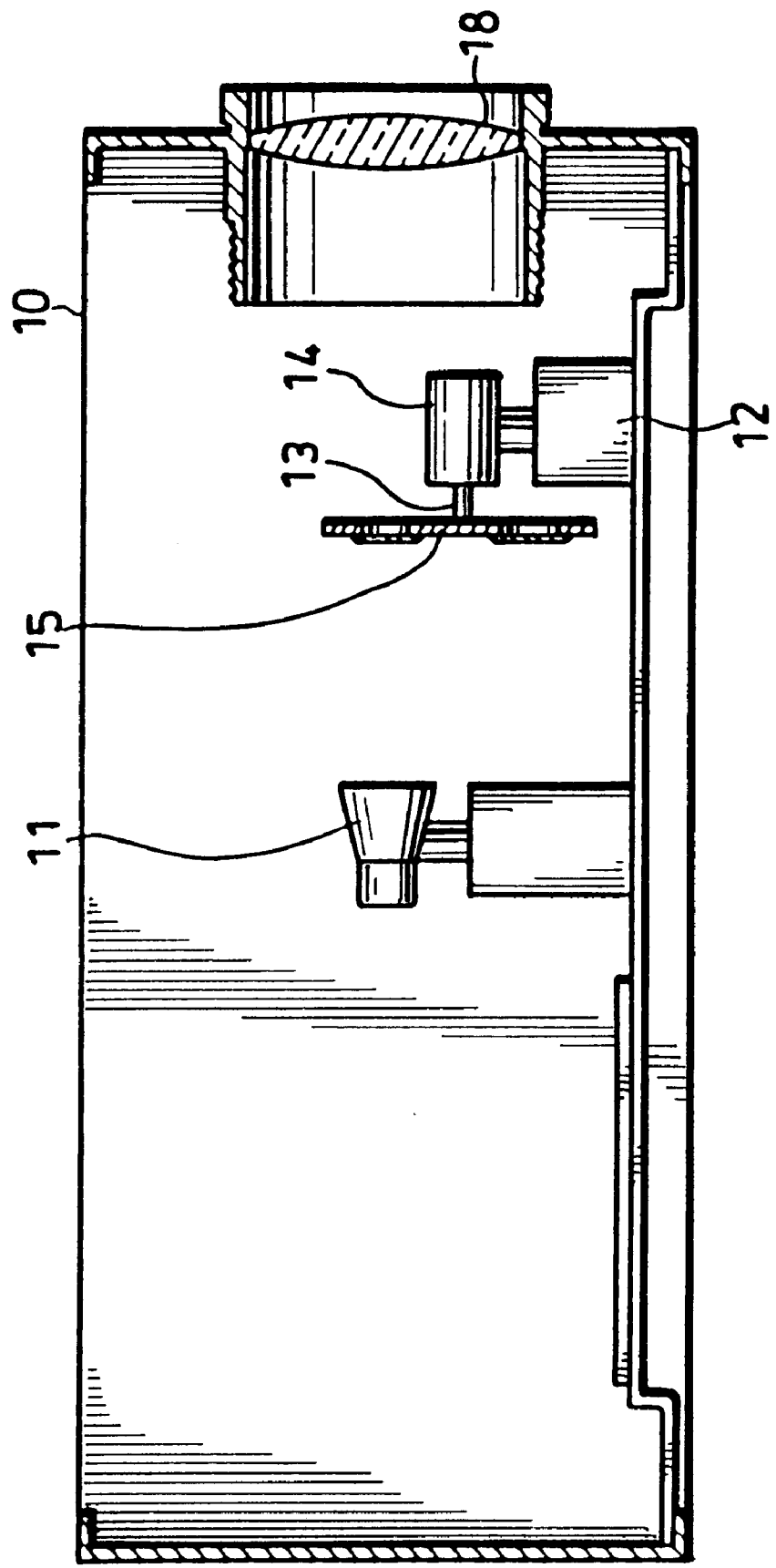
FIG. 1 illustrates a first conventional light projecting device.
Figures 2, 2A:
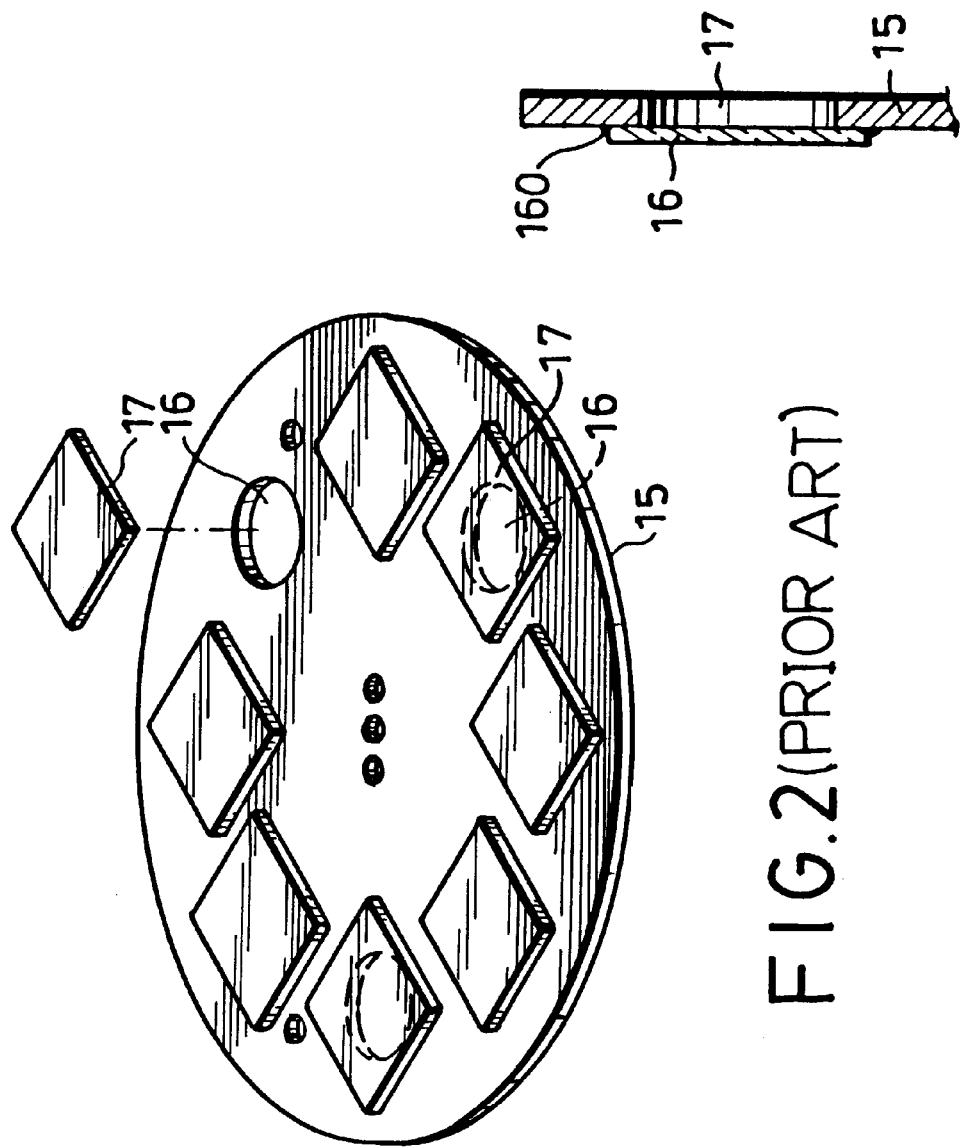
FIGS. 2 and 2A actively show a shielding wheel employed in the first conventional light projecting device.
Figure 3:
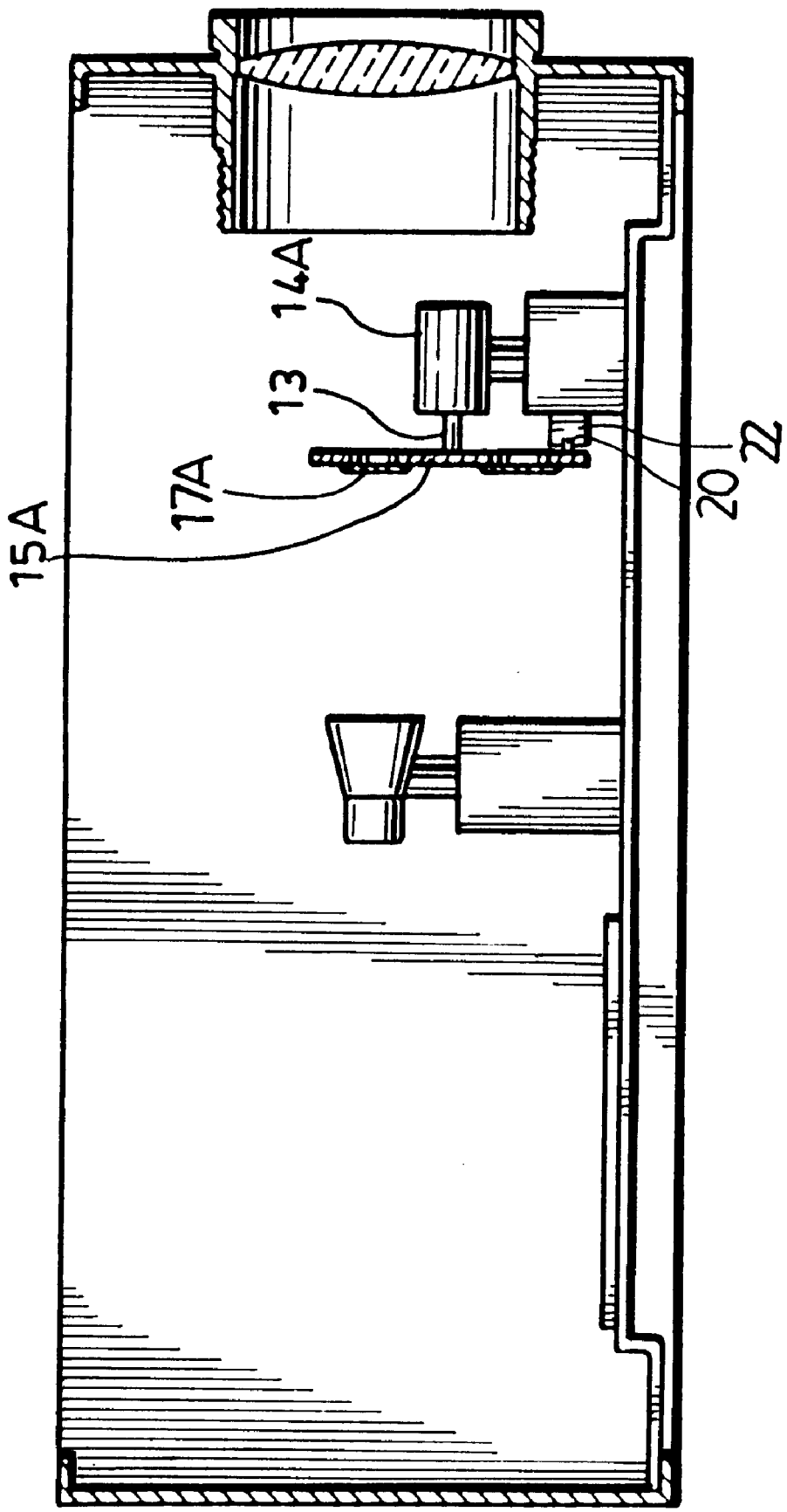
FIG. 3 illustrates a second conventional light projecting device.
Figure 4:
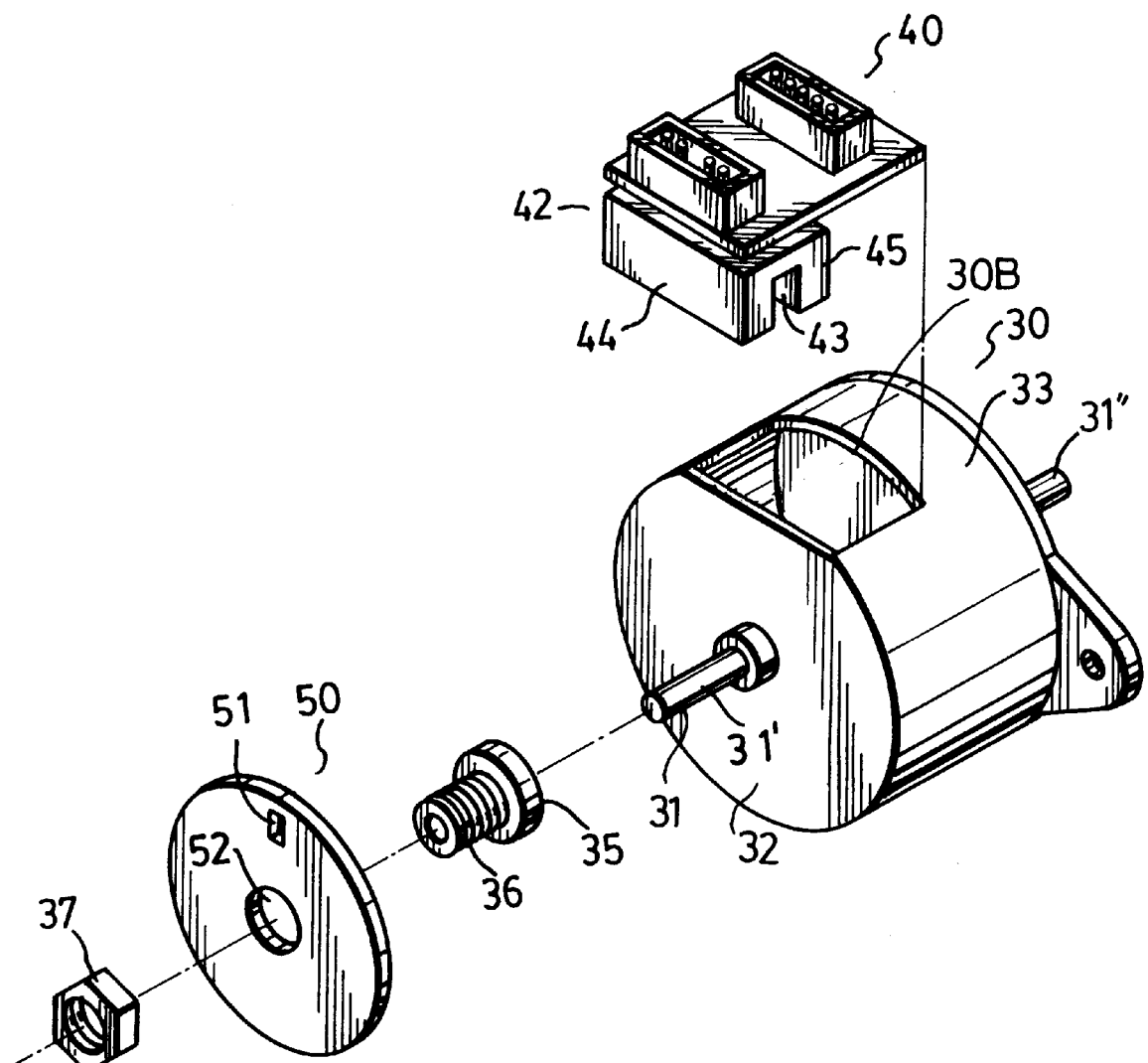
FIG. 4 illustrates an exploded view of a control apparatus of this invention shown together with a stepping motor.
Figure 5:
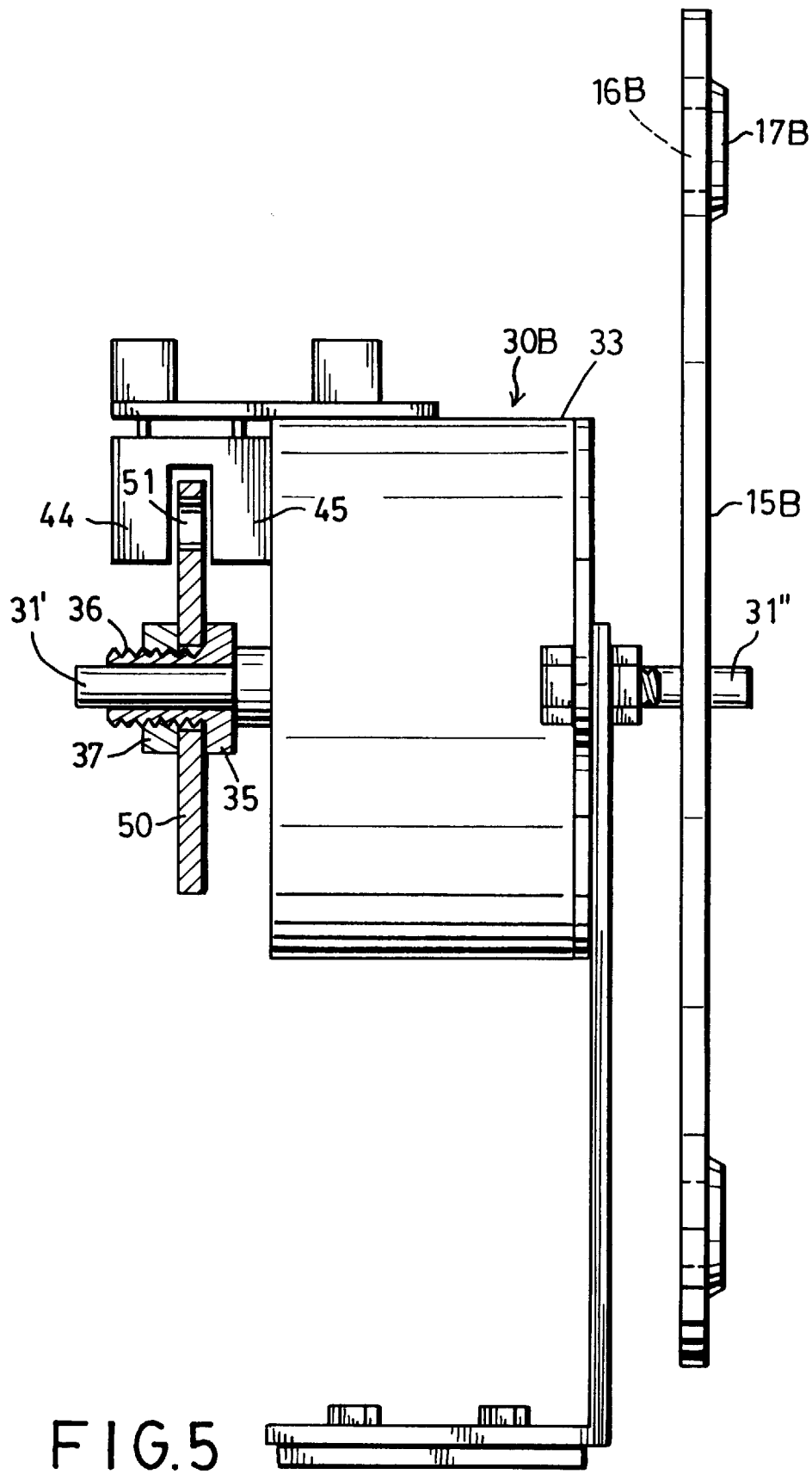
FIG. 5 illustrates how the control apparatus of this invention is mounted on the stepping motor shown in FIG. 4.

Referring to FIGS. 4 and 5, the control apparatus of this invention is capable of resetting a shielding wheel 15B of a stepwise light projecting device to a predetermined starting position, and is shown to include a photosensor 42, a slotted wheel 50, and control circuit means 40.

The stepwise light projecting device includes a stepping motor 30 with a casing 30B, the shielding wheel 15B, and a light source (not visible). The stepping motor 30 further includes a rotor mounted rotatably in the casing 30B, and an output shaft 31 coupled to and driven by the rotor. The output shaft 31 has front and rear ends 31", 31' that respectively extend outwardly of front and rear lateral walls 32 of the casing 30B. The shielding wheel 15B is mounted and uprightly on, and is rotatable with the front end 31" of the shaft 31. The shielding wheel 15B has a peripheral portion which is sized so as to extend above the top wall 33 of the casing 30B. The shielding wheel 15B has a plurality of through holes 16B that are formed through the peripheral portion and that are angularly spaced from one anther by an interval. A plurality of differently colored transparent sheets 17B are attached to the shielding wheel 15B to cover the through holes 16B, respectively.

The light source (not shown) is disposed behind the shielding wheel 15B in a conventional manner in order to emit a light beam which travels along a route above the top wall 33 of the casing 30B and which passes successively through the colored transparent sheets 17B when the shielding wheel 15B rotates so as to illuminate an object in front of the shielding wheel 15B with the colored light rays.

The photosensor 42 is mounted on the rear lateral wall 32 of the casing 30B of the stepping motor 30 and is connected electrically to the control circuit means 40. The photosensor 42 includes a phototransmitter 44 and a photoreceiver 45 spaced from the phototransmitter 44 to define a channel 43 therebetween. A bushing 35 is fixed on the rear end 31' of the output shaft 31 of the rotor. The slotted wheel 50 has a central mounting hole 52 sleeved uprightly and coaxially on the bushing 35. A fastener nut 37 is threaded on a threaded portion 36 of the bushing 35 so that the slotted wheel 50 is rotatable together with the shaft 31. The slotted wheel 50 has a circumferential portion that extends into the channel 43 and that is formed with a radial slot 51 to permit transmission of radiant energy from the phototransmitter 44 to the photoreceiver 45 only when the shielding wheel 15B is in the predetermined starting position such that one of the colored transparent sheets 17B is aligned with the light source (not shown).

The control circuit means 40, which is disposed on a printed circuit board, is connected electrically to the photosensor 42 and the stepping motor 30. The control circuit means 40 is activable to operate in an initialization mode, in which the circuit means 40 can activate the stepping motor 30 to rotate the shielding wheel 15B stepwise by a first angular magnitude smaller than the interval between an adjacent pair of the through holes 16B in the shielding wheel 15B when the slotted wheel 50 blocks transmission of the radiant energy from the phototransmitter 44 to the photoreceiver 45 until the shielding wheel 15B is in the predetermined starting position. After the initialization mode, the control circuit means 40 is activable to operate in a regular mode, in which the stepping motor 30 rotates the shielding wheel 15B stepwise by a second angular magnitude equal to the interval between the adjacent pair of the through holes in the shielding wheel 15B in order to result in a predetermined stepwise light projecting effect when the light source is activated.

The first angular magnitude is less than half of the interval between the adjacent pair of the through holes 16B in the shielding wheel 15b. Preferably, the first angular magnitude is equal to the minimum step angle that can be accommodate by the stepping motor 30.

With this invention thus explained, it is apparent that numerous modifications and variations can be made without departing from the scope and spirit of this invention. It is therefore intended that this invention be limited only as indicated in the appended claims.

I claim:

1. A control apparatus for a stepwise light projecting device which includes:

a stepping motor with a casing having a top wall and front and rear lateral walls, a rotor mounted rotatably in the casing, and an output shaft coupled to and driven by the rotor, the output shaft having front and rear ends that respectively extend outwardly of the front and rear lateral walls, a shielding wheel mounted uprightly and coaxially on, and capable of rotating with the front end of the output shaft, the shielding wheel having a peripheral portion which is sized so as to extend above the top wall of the casing and which is formed with a plurality of through holes angularly spaced from one another by an interval, the shielding wheel being provided with a plurality of differently colored transparent sheets that cover the through holes respectively, and a light source disposed spacedly behind the shielding wheel, the light source being capable of being activated so as to emit a light beam that travels along a route above the top wall of the casing of the stepping motor and that passes successively through the colored transparent sheets when the shielding wheel rotates so as to illuminate an object in front of the shielding wheel with colored light rays, said control apparatus comprising:

a photosensor adapted to be mounted on the rear lateral wall of the casing of the stepping motor, said photosensor including a phototransmitter and a photoreceiver spaced from said phototransmitter to define a channel therebetween;

a slotted wheel adapted to be mounted detachably and uprightly on and adapted to rotate with the rear end of the output shaft, said slotted wheel having a circumferential portion which extends into said channel of said photosensor and which is formed with a radial slot to permit transmission of radiant energy from said phototransmitter to said photoreceiver only when the shielding wheel is in a predetermined starting position such that one of the colored transparent sheets is aligned with the light source; and control circuit means connected electrically to said photosensor and adapted to be connected electrically to the stepping motor, said control circuit means being activable to operate in an initialization mode, in which said control circuit means is adapted to activate the stepping motor to rotate the shielding wheel stepwise by a first angular magnitude smaller than the interval between an adjacent pair of the through holes in the shielding wheel when said slotted wheel blocks transmission of the radiant energy from said phototransmitter to said photoreceiver until the shielding wheel is in the predetermined starting position, and in a regular mode after the initialization mode, in which said control circuit means is adapted to activate the stepping motor to rotate the shielding wheel stepwise by a second angular magnitude equal to the interval between the adjacent pair of the through holes in the shielding wheel in order to result in a predetermined stepwise light projecting effect when the light source is activated.

2. The control apparatus as defined in claim 1, wherein said first angular magnitude of step is less than half of the interval between the adjacent pair of the through holes in the shielding wheel.

3. A stepwise light projecting assembly comprising:

a stepping motor with a casing having a top wall and front and rear lateral walls, a rotor mounted rotatably in the casing, and an output shaft coupled to and driven by the rotor, the output shaft having front and rear ends that respectively extend outwardly of the front and rear lateral walls;

a shielding wheel mounted uprightly on and capable of rotating with the front end of the output shaft, the shielding wheel having a peripheral portion which is sized so as to extend above the top wall of the casing of the stepping motor and which is formed with a plurality of through holes angularly spaced from one another by an interval, the shielding wheel being provided with a plurality of differently colored transparent sheets that cover the through holes respectively;

a light source disposed spacedly behind the shielding wheel, the light source being capable of being activated so as to emit a light beam that travels along a route above the top wall of the casing of the stepping motor and that passes successively through the colored transparent sheets when the shielding wheel rotates so as to illuminate an object in front of the shielding wheel with colored light rays; and a control apparatus including:

a photosensor which is mounted on the rear lateral wall of the casing of the stepping motor and which includes a phototransmitter and a photoreceiver spaced from said phototransmitter to define a channel therebetween, a slotted wheel mounted detachably and uprightly on and rotatable with the rear end of the output shaft, said slotted wheel having a circumferential portion which extends into said channel of said photosensor and which is formed with a radial slot to permit transmission of radiant energy from said phototransmitter to said photoreceiver only when the shielding wheel is in a predetermined starting position such that one of the colored transparent sheets is aligned with the light source, control circuit means connected electrically to said photosensor and the stepping motor, and activable to operate in an initialization mode, in which said control circuit means activates the stepping motor to rotate the shielding wheel stepwise by a first angular magnitude smaller than said interval between an adjacent pair of the through holes in the shielding wheel when said slotted wheel blocks transmission of the radiant energy from said phototransmitter to said photoreceiver until the shielding wheel is in the predetermined starting position, and in a regular mode after the initialization mode, in which said control circuit means activates the stepping motor to rotate the shielding wheel stepwise by a second angular magnitude of step equal to said interval between the adjacent pair of the through holes in the shielding wheel in order to result in a predetermined stepwise light projecting effect when the light source is activated.

* * * * *